United States Patent
Rethinam et al.

(10) Patent No.: US 9,742,322 B2
(45) Date of Patent: Aug. 22, 2017

(54) TECHNIQUES FOR CONTROLLING A BRUSHLESS DC (BLDC) ELECTRIC MOTOR

(71) Applicant: Infineon Technologies AG, Neubiberg (DE)

(72) Inventors: Nagappan Rethinam, Bangalore (IN); Prashant Abhishek, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/796,754

(22) Filed: Jul. 10, 2015

(65) Prior Publication Data
US 2017/0012559 A1    Jan. 12, 2017

(51) Int. Cl.
  *H02P 6/16*    (2016.01)
  *H02P 6/00*    (2016.01)
  *H02P 6/12*    (2006.01)
  *H02P 6/14*    (2016.01)
  *H02P 29/028*  (2016.01)

(52) U.S. Cl.
  CPC .............. *H02P 6/16* (2013.01); *H02P 6/002* (2013.01); *H02P 6/12* (2013.01); *H02P 6/14* (2013.01); *H02P 29/028* (2013.01)

(58) Field of Classification Search
  CPC .............. H02P 6/16; H02P 6/12; H02P 6/14
  See application file for complete search history.

(56) References Cited

U.S. PATENT DOCUMENTS

| | | | |
|---|---|---|---|
| 5,563,481 A | * 10/1996 | Krause | A61B 17/32002 318/400.09 |
| 6,120,462 A | * 9/2000 | Hibner | A61B 10/0275 600/566 |
| 8,362,726 B2 | 1/2013 | Kawamura et al. | |
| 8,593,093 B2 | 11/2013 | Hisano et al. | |

(Continued)

FOREIGN PATENT DOCUMENTS

| | | |
|---|---|---|
| DE | 19517665 A1 | 11/1996 |
| DE | 102011085896 A1 | 9/2012 |

(Continued)

OTHER PUBLICATIONS

"XC866, Brushless DC Motor Control with Hall Sensors Using Infineon 8-bit XC866 Microcontroller," Infineon, APO8026, Application Note, V1.0, Oct. 20, 2006, 13 pp.

(Continued)

Primary Examiner — Shawki S Ismail
Assistant Examiner — Muhammad S Islam
(74) Attorney, Agent, or Firm — Shumaker & Sieffert, P.A.

(57) ABSTRACT

A controller for controlling a brushless DC (BLDC) electric motor is described. The controller may include a hall control module and a timing module. The hall control module may be configured to receive inputs from three hall sensors, detect one of the three hall sensors has failed based on the received inputs, responsive to detecting that the one of the three hall sensors has failed, switch from a three hall sensors mode to a two hall sensors mode, and generate an output to (Continued)

control a plurality of switches to energize appropriate motor phase windings in the BLDC motor based at least in part on the two hall sensors mode. The timing module may be configured to detect a commutation time from the received inputs.

20 Claims, 8 Drawing Sheets

(56) References Cited

U.S. PATENT DOCUMENTS

| | | | | |
|---|---|---|---|---|
| 2009/0121664 A1* | 5/2009 | Sugimoto | ............. | E05F 15/697 318/400.09 |
| 2011/0043146 A1* | 2/2011 | Sato | ......................... | H02P 6/12 318/400.04 |

FOREIGN PATENT DOCUMENTS

| | | |
|---|---|---|
| DE | 112009004758 | 12/2012 |
| DE | 102014220922 A1 | 4/2016 |

OTHER PUBLICATIONS

"XC164CS/CM, Speed control of Brushless DC motor with Hall sensor using DAvE Drive for Infineon XC164CM/CS microcontrollers," Infineon, AP16117, Application Note, V1.0, Jul. 4, 2007, 55 pp.

"Microcontroller, AP90001 Hardware Description, Low Voltage Inverter," Infineon, Application Note, V1.0, Jan. 29, 2009, 20 pp.

Office Action, in the German language, from counterpart German Application No. 102016111891.5, dated Jul. 14, 2016, 4 pp.

* cited by examiner

COMMUTATION PATTERN AND HALL TABLE – THREE HALL SENSORS MODE 200

| INPUTS 10 | | | OUTPUTS 3 | | | | | |
|---|---|---|---|---|---|---|---|---|
| HALL 10C | HALL 10B | HALL 10A | A- | A+ | B- | B+ | C- | C+ |
| 0 | 1 | 0 | ON | OFF | OFF | OFF | OFF | ON |
| 1 | 1 | 0 | ON | OFF | OFF | ON | OFF | OFF |
| 1 | 0 | 0 | OFF | OFF | OFF | ON | ON | OFF |
| 1 | 0 | 1 | OFF | ON | OFF | OFF | ON | OFF |
| 0 | 0 | 1 | OFF | ON | ON | OFF | OFF | OFF |
| 0 | 1 | 1 | OFF | OFF | ON | OFF | OFF | ON |

FIG. 5

COMMUTATION PATTERN AND HALL TABLE – TWO HALL SENSORS MODE 300

| INPUTS 10 | | | OUTPUTS 3 | | | | | |
|---|---|---|---|---|---|---|---|---|
| HALL 10C | HALL 10B | HALL 10A | A- | A+ | B- | B+ | C- | C+ |
| 0 | 1 | 0 | ON | OFF | OFF | OFF | OFF | ON |
| 0 | 1 | 0 | ON | OFF | OFF | ON | OFF | OFF |
| 0 | 0 | 0 | OFF | OFF | OFF | ON | ON | OFF |
| 0 | 0 | 1 | OFF | ON | OFF | OFF | ON | OFF |
| 0 | 0 | 1 | OFF | ON | ON | OFF | OFF | OFF |
| 0 | 1 | 1 | OFF | OFF | ON | OFF | OFF | ON |

FIG. 6

| Three Hall Sensors Mode | | | Open Loop Mode | | | Two Hall Sensors Mode | | |
| --- | --- | --- | --- | --- | --- | --- | --- | --- |
| Hall 10C | Hall 10B | Hall 10A | Hall 10C | Hall 10B | Hall 10A | Hall 10C/Timer | Hall 10B | Hall 10A |
| 0 | 0 | 1 | X | 0 | 1 | Timer Interrupt | 0 | 1 |
| 0 | 1 | 1 | X | 1 | 1 | X | 1 | 1 |
| 0 | 1 | 0 | X | 1 | 0 | X | 1 | 0 |
| 1 | 1 | 0 | X | 1 | 0 | Timer Interrupt | 1 | 0 |
| 1 | 0 | 0 | X | 0 | 0 | X | 0 | 0 |
| 1 | 0 | 1 | X | 0 | 1 | X | 0 | 1 |

FIG. 8

TECHNIQUES FOR CONTROLLING A BRUSHLESS DC (BLDC) ELECTRIC MOTOR

TECHNICAL FIELD

This disclosure relates to electric motors, and more particular, to techniques and circuits associated with brushless DC (BLDC) electric motors.

BACKGROUND

Operation of BLDC motors may be performed at least in part by a controller. The controller controls the rotor rotation of the BLDC motor based on the position of the rotor relative to the stator coils. In some examples, the controller may use Hall Effect sensors or a rotary encoder to directly measure the position of the rotor. In other examples, the controller may measure the back electromotive force in the undriven coils of the BLDC motor to infer the position of the rotor without separate Hall Effect sensors. In these examples, the controller may be referred to as a "sensorless" controller, and requires a restart of the BLDC motor.

SUMMARY

The disclosure describes techniques, devices and systems for improving operation of a brushless DC (BLDC) electric motor and three Hall Effect sensors (hereinafter "hall sensors"). The techniques may enable a controller to switch from operating in a three hall sensors mode to a two hall sensors mode when one of the three hall sensors has failed.

In some examples, the disclosure is directed to a method for controlling a BLDC motor. The method comprising receiving inputs from three hall sensors, detecting one of the three hall sensors has failed based on the received inputs, responsive to detecting that the one of the three hall sensors has failed, switching from a three hall sensors mode to a two hall sensors mode, and generating an output to control a plurality of switches to energize appropriate motor phase windings in the BLDC motor based at least in part on the two hall sensors mode.

In some examples, the disclosure is directed to a controller for controlling BLDC motor. The controller comprising a hall control module configured to receive inputs from three hall sensors, detect one of the three hall sensors has failed based on the received inputs, responsive to detecting that the one of the three hall sensors has failed, switch from a three hall sensors mode to a two hall sensors mode, and generate an output to control a plurality of switches to energize appropriate motor phase windings in the BLDC motor based at least in part on the two hall sensors mode.

In some examples, the disclosure is directed to a system including three hall sensors, a BLDC motor, and a controller for controlling the BLDC motor. The controller includes a hall control module configured to receive inputs from the three hall sensors, detect one of the three hall sensors has failed based on the received inputs, responsive to detecting that the one of the three hall sensors has failed, switch from a three hall sensors mode to a two hall sensors mode, and generate an output to control a plurality of switches to energize appropriate motor phase windings in the BLDC motor based at least in part on the two hall sensors mode.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 5 is a table illustrating an example commutation pattern and hall table for the three hall sensors mode for one complete electrical revolution of a BLDC motor, in accordance with one or more aspects of this disclosure.

FIG. 6 is a table illustrating an example commutation pattern and hall table for the two hall sensors mode for one complete electrical revolution of a BLDC motor, in accordance with one or more aspects of this disclosure.

FIG. 8 is a table illustrating example hall tables for the example modes of a controller, in accordance with one or more aspects of this disclosure.

DETAILED DESCRIPTION

The disclosure describes techniques for controlling an electric motor, such as a brushless DC (BLDC) electric motor. A system may include a controller, a plurality of electronic switches, a plurality of sensors (e.g., hall sensors), and a BLDC motor. The controller may be configured to receive inputs (e.g., hall sensor signals) from the plurality of sensors and generate an output or outputs based on the inputs from the plurality of sensors to control the plurality of electronic switches and the BLDC motor. In some examples, the controller may determine a rotor position of the BLDC motor based on the inputs from the plurality of sensors that may be used to adjust the generated output. Accordingly, the controller may control the plurality of electronic switches of the BLDC motor to operate the motor when the plurality of sensors is functioning properly.

In some examples, the controller may be configured to detect one sensor of the plurality of sensors has failed based on the received inputs from the plurality of sensors. In some examples, the controller may operate in an open-loop mode for at least one electrical revolution of the BLDC motor. The controller may retain control of the BLDC motor if one the plurality of sensors is nonoperational by identifying the failed sensor and operating the BLDC motor by compensating for the failed sensor. For example, the controller may compensate for the failed sensor by switching from a three hall sensors mode to a two hall sensor mode. In some examples, compensating for the failed sensor may maintain one or more operational characteristics of the BLDC motor. Accordingly, the controller may improve operation of the BLDC motor by not requiring a restart or immediate repair of the BLDC motor when one sensor of the plurality of sensors fails to function properly.

Figure 1:
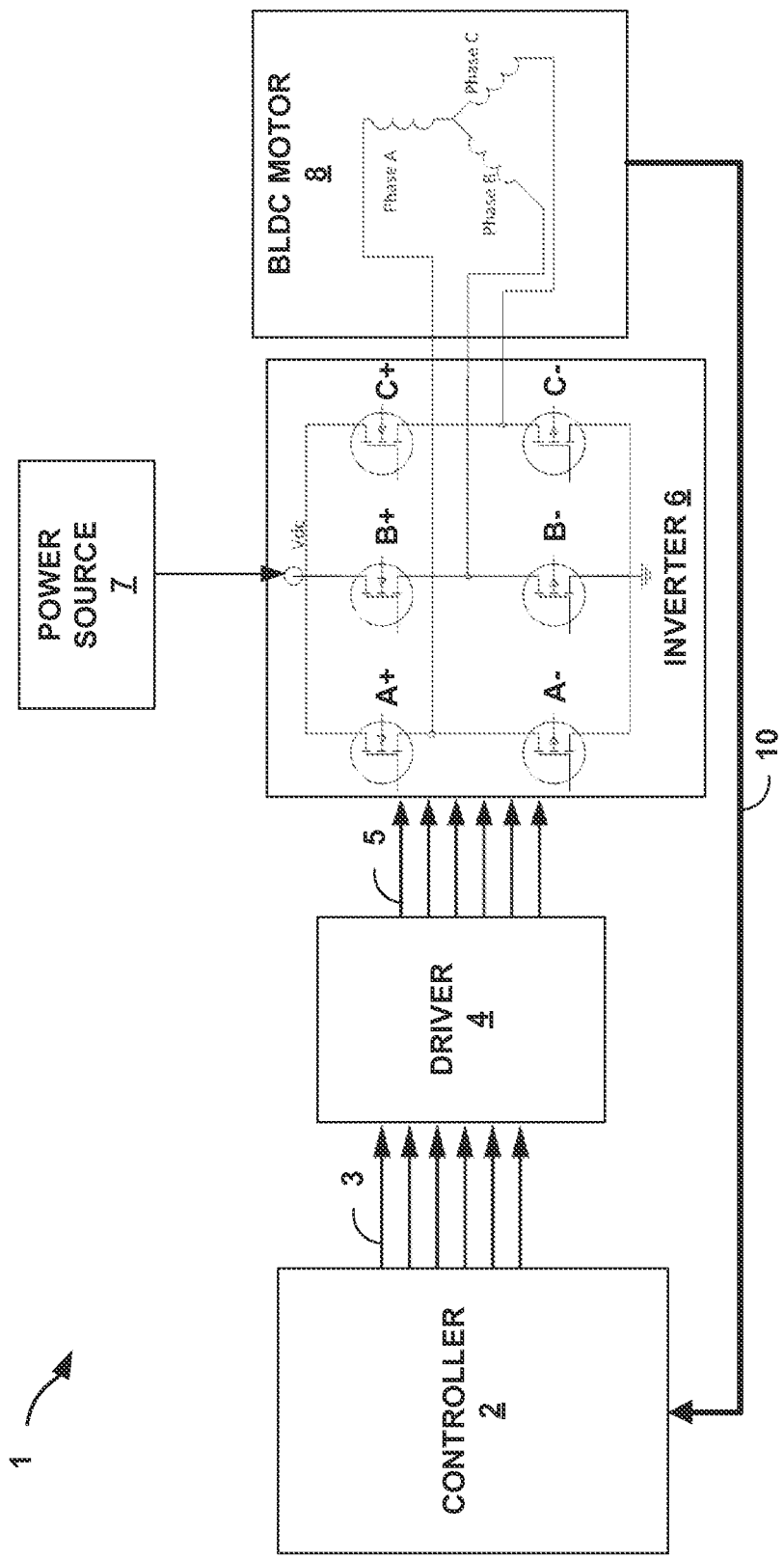
FIG. 1 is a block diagram illustrating an example system for controlling the operation of a brushless DC (BLDC) motor, in accordance with one or more aspects of this disclosure.

FIG. 1 is a block diagram illustrating example system 1 for controlling the operation of brushless DC (BLDC) electric motor 8, in accordance with one or more aspects of this disclosure. FIG. 1 shows system 1 as having separate and distinct components, shown as controller 2, driver 4, a plurality of switches (e.g., switches A+ to C−, collectively "inverter 6"), power source 7, and BLDC motor 8, however system 1 may include additional or fewer components. For instance, controller 2, driver 4, inverter 6, power source 7, and BLDC motor 8 may be five individual components or may represent a combination of one or more components that provide the functionality of system 1 as described herein.

System 1 may include power source 7, which provides electrical power to BLDC motor 8. For example, when power source 7 comprises a generator or generators, transformers, batteries, solar panels, or regenerative braking systems, system 1 may include power source 7. In other examples, system 1 may be separate from power source 7. For example, when power source 7 comprises power grids, generators, transformers, external batteries, external solar panels, windmills, hydro-electrical or wind-powered generators, or any other form of devices that are capable of providing electrical power to system 1, system 1 may be separate from power source 7. As described above, numerous examples of power source 7 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 may include controller 2, driver 4, inverter 6, and BLDC motor 8. In some examples, system 1 may be part of electric or hybrid vehicles. Examples of electric or hybrid vehicles include passenger vehicles, commercial vehicles, all-terrain vehicles, watercraft, aircraft, or any other type of vehicle. However, system 1 is not limited to vehicles and may include any machine with BLDC motor 8.

In some examples, controller 2 may be configured to operate BLDC motor 8 based on inputs from a plurality of sensors. For example, controller 2 may be configured to operate a three-phase BLDC motor 8 with three hall sensors. In some examples, controller 2 may also be configured to operate the three-phase BLDC motor 8 with three hall sensors, when two hall sensors are functioning properly and when a third hall sensor is not functioning properly. For example, controller 2 may be configured to generate outputs 3 that comprise modulated signals that determine the average voltage and current to the coils of BLDC motor 8 and also determine motor speed and torque of BLDC motor 8 based on received inputs (e.g., hall sensors signals) from the three hall sensors. In some examples, controller 2 may control BLDC motor 8 using a six-step commutation sequence for each electrical revolution of BLDC motor 8.

The ability of controller 2 to switch BLDC motor 8 from operating in a three hall sensors mode to operating in a two hall sensors mode may provide improved control of BLDC motor 8. In some examples, controller 2 may be configured to control BLDC motor 8 in a three hall sensors mode such that, if a hall sensor of the plurality of hall sensors fails, controller 2 may still control BLDC motor 8 via the two hall sensors mode with no effect or a substantially reduced effect to the operation of BLDC motor 8. In some examples, improved control of BLDC motor 8 may improve safety or reliability by maintaining control of BLDC motor 8 if a hall sensor becomes non-operational. For example, controller 2 may be configured to switch from controlling BLDC motor 8 in a three hall sensors mode to a two hall sensors mode, such that controller 2 does not require a restart BLDC motor 8.

Driver 4 mirrors and generates driver outputs 5 based on outputs 3 from controller 2. In some examples, driver 4 may include an insulated-gate bipolar transistor (IGBT) driver, a metal oxide semiconductor field effect transistor (MOSFET) driver, a gallium nitride (GaN) driver, or any other driver capable of mirroring the output from controller 2 and providing the mirrored output to inverter 6.

Inverter 6 includes a three-phase inverter, where three is the same number of phases of BLDC motor 8. Inverter 6 includes one or more switches (e.g., MOS power switch transistors based switches, gallium nitride (GaN) based switches, or other types of switch devices) that are controlled by controller 2, according to one or more modulation techniques. Controller 2 may include one or more gate drivers (e.g., driver 4) and control logic to control (e.g., turn-on and turn-off) the one or more switches using modulation techniques. The modulation of the switches of inverter 6 may operate according to pulse density modulation (PDM), pulse width modulation (PWM), pulse frequency modulation (PFM), or another suitable modulation technique. In PWM, the width (i.e., duration) of the pulse is modulated based on a modulator signal. In PDM, the relative density of a pulse corresponds to an analog signal's amplitude. In PFM, the frequency of a pulse train is varied based on the instantaneous amplitude of the modulating signal at sampling intervals. By controlling the switches of inverter 6 using modulation techniques and the techniques as described herein, controller 2 may regulate operation of BLDC motor 8 and not require a restart of BLDC motor 8 when one hall sensors of three hall sensors fails.

In some examples, BLDC motor 8 may include a permanent magnet synchronous motor (PMSM). For example, a PMSM may include a shaft, rotor, stator, and permanent magnet. A permanent magnet may be mounted on or in the rotor. In some examples, the permanent magnet may be surface mounted to the rotor, inset in the rotor, or buried within the rotor. In some examples, the permanent magnet may be an interior magnet. The permanent magnet may include rare-earth elements, such as Neodymium-Iron-Boron (NdFeB), Samarium-Cobalt (SmCo), or Ferrite elements (e.g., Barium (Ba) or Strontium (Sr)). In some examples, the permanent magnet may include a protective coating such as a layer of Gold (Au), Nickel (Ni), Zinc (Zn), or the like. BLDC motor 8 may include sensors (e.g., Hall-Effect sensors or "hall sensors") for detecting and measuring the stator currents $I_a$, $I_b$, and $I_c$, motor velocity $\omega_e$, and/or rotor position. In the example of FIG. 1, the hall sensors may each output a hall sensor digital signal (e.g., three individual hall sensors may output digital hall sensor signals 10A, 10B, and 10C, collectively "inputs 10") to controller 2 based on the rotating magnetic field that each hall sensor detects in BLDC motor 8. In some examples, the hall sensors may output inputs 10 as a logic level, such that logical HIGH and logical LOW may generally correspond to a binary 1 and 0, respectively.

Figure 2:
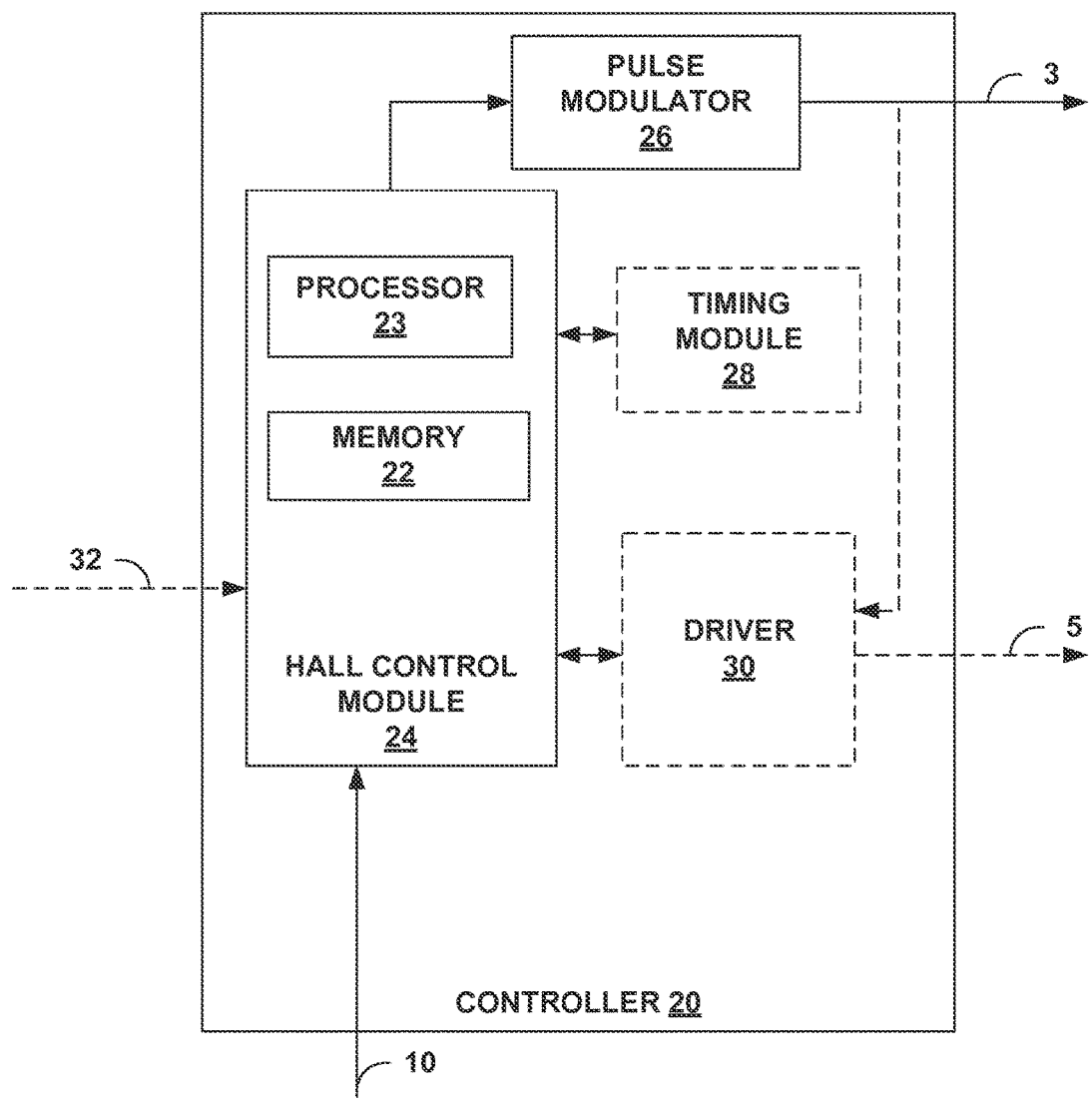
FIG. 2 is a block diagram illustrating an example controller, in accordance with one or more aspects of this disclosure.

FIG. 2 is a block diagram illustrating example controller 20, in accordance with one or more aspects of this disclosure. Controller 20 includes hall control module 24, pulse modulator 26, optional timing module 28, and optional driver 30. Controller 20 may correspond to controller 2 as described in FIG. 1, and control inverter 6 via hall control module 24 and phase modulator 26. As a result, controller 20 may control BLDC motor 8. In other examples, controller 20 may include a greater or fewer number of components. For example, if system 1 as described in FIG. 1 includes a driver and an external timer, then controller 20 may not include optional timing module 28, and optional driver 30. In general, controller 20 may comprise any suitable arrangement of hardware, alone or in combination with software and/or firmware, to perform the various techniques described herein attributed to controller 20 and hall control module 24.

Hall control module 24 may include memory 22, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, memory 22 may be configured to store lookup tables with data representative of commutation pattern outputs associated with hall patterns. In some examples, memory 22 may be configured to store a commutation pattern and hall table for a three hall sensors mode, an open loop mode, and a two hall sensors mode. In some examples, memory 22 may also be configured to store a look up table of expected hall patterns.

In various examples, hall control module 24 may also include one or more processors 23, such as one or more microprocessors, digital signal processors (DSPs), application specific integrated circuits (ASICs), field programmable gate arrays (FPGAs), or any other equivalent integrated or discrete logic circuitry, as well as any combinations of such components. In some examples, hall control module 24 may be configured to receive inputs 10 and output reference voltages to pulse modulator 26 based on received inputs 10.

Pulse modulator 26 may include one or more pulse modulation devices. Pulse modulator 26 may operate according to pulse density modulation (PDM), pulse width modulation (PWM), pulse frequency modulation (PFM), or another suitable pulse modulation technique. Pulse modulator 26 may receive reference voltages from hall control module 24 and provide modulated outputs 3 to a driver (e.g., optional driver 30, or driver 4 as described in FIG. 1).

Timing module 28 is optional and includes a clock, an oscillator, or any electronic timing device capable of providing a timing input (e.g., a timer interrupt) to hall control module 24 and detecting a commutation time of inputs 10. In some examples, timing module 28 may be a timer located external to controller 20, and provides timing input 32 to controller 20. In some examples, timing input 32 may be used by hall control module of controller 20 to determine a commutation time and/or provide timer interrupts for a period match interrupt service routine (ISR). Driver 30 is optional and includes an IGBT driver, a MOSFET driver, or any driver capable of driving inverter 6 with driver outputs 5.

Hall control module 24 may adjust the reference voltages provided to pulse modulator 26 based on inputs 10 and whether hall control module is in a three hall sensors mode or a two hall sensors mode. Pulse modulator 26 may adjust the duty cycle of inverter 6 based on reference voltages provided by hall control module 24 via a driver (e.g., driver 30). As a result, controller 20 may improve the operation of BLDC motor 8 when one sensor of the three hall sensors fails by preventing or substantially reducing any impact of the failed hall sensor on the operation of BLDC motor 8. Further detail of controller 20 improving the operation of BLDC motor 8 when one hall sensor of the three halls sensors fails is described in FIGS. 4-8.

Figure 3:
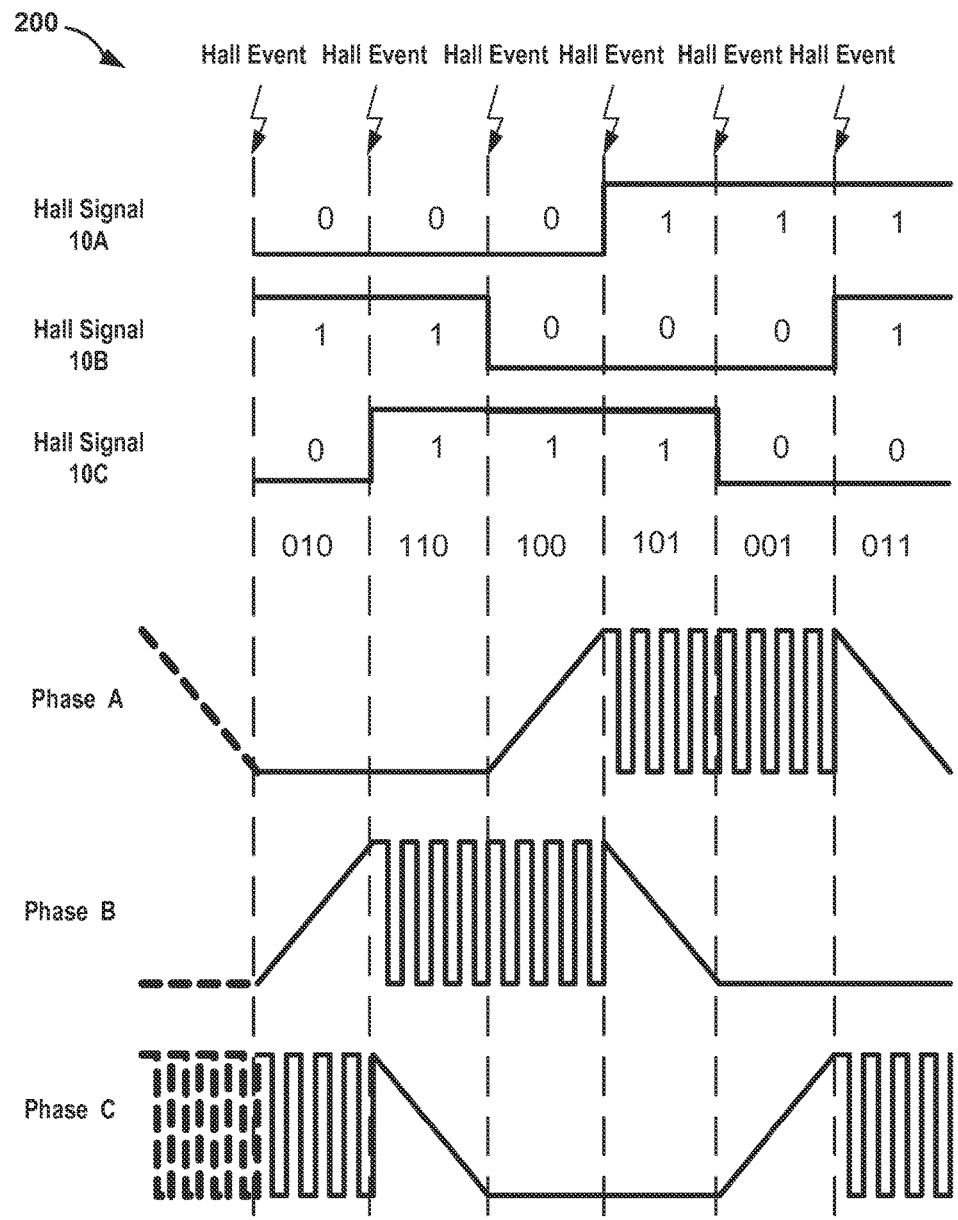
FIG. 3 is a timing diagram illustrating an example three hall sensors mode for one complete electrical revolution of a BLDC motor, in accordance with one or more aspects of this disclosure.

FIG. 3 is a timing diagram illustrating an example three hall sensors mode 200 for one complete electrical revolution of BLDC motor 8, in accordance with one or more aspects of this disclosure. FIG. 3 is described with respect to FIGS. 1 and 2. In the example of FIG. 3, three hall sensors mode 200 has six hall events or changes in Hall sensor signals 10A, 10B, and 10C (e.g., changes in inputs 10 received by controller 20) every sixty degrees of electrical rotation of BLDC motor 8. Processor 23 may compare a sampled hall pattern (e.g., inputs 10 sampled at a particular time) to an expected hall pattern (e.g., a hall pattern stored in a look up table in memory 22). Processor 23 may also capture time with an external timer or a timing module between two correct hall events to calculate the motor speed of BLDC motor 8.

For example, an initial hall event of three hall sensors, where a first hall sensor (Hall Signal 10A) is LOW, a second hall sensor (Hall Signal 10B) is HIGH, and a third hall sensor (Halt Signal 10C) is LOW. In this example, a second hall event of three hall sensors, where a first hall sensor (Hall Signal 10A) is LOW, a second hall sensor (Hall Signal 10B) is HIGH, and a third hall sensor (Hall Signal 10C) is HIGH. In this example, a third hall event of three hall sensors, where a first hall sensor (Hall Signal 10A) is LOW, a second hall sensor (Hall Signal 10B) is LOW, and a third hall sensor (Hall Signal 10C) is HIGH. In this example, a fourth hall event of three hall sensors, where a first hall sensor (Hall Signal 10A) is HIGH, a second hall sensor (Hall Signal 10B) is LOW, and a third hall sensor (Hall Signal 10C) is HIGH. In this example, a fifth hall event of three hall sensors, where a first hall sensor (Hall Signal 10A) is HIGH, a second hall sensor (Hall Signal 10B) is LOW, and a third hall sensor (Hall Signal 10C) is LOW. In this example, a sixth hall event of three hall sensors, where a first hall sensor (Hall Signal 10A) is HIGH, a second hall sensor (Hall Signal 10B) is HIGH, and a third hall sensor (Hall Signal 10C) is LOW.

As illustrated in FIG. 3, inputs 10 (e.g., Hall signals 10A, 10B, and 10C) from the three hall sensors received by controller 20 may be HIGH or LOW digital signals similar to binary inputs. In some examples, the first hall event may be 010, the second hall event may be 110, the third hall event may be 100, the fourth hall event may be 101, the fifth hall event may be 001, and the sixth hall event may be 011.

In three hall sensors mode 200, during each hall event, controller 20 may turn ON and OFF switches (e.g., generate outputs 3 to turn ON and OFF switches A+ to C−) to either connect or maintain a connection of a particular motor phase winding (e.g., Phase A, Phase B, or Phase C) to a voltage $V_{dc}$ or aground, or disconnect the particular motor phase winding from both the voltage $V_{dc}$ and the ground. As illustrated by FIG. 3, each of the motor phase windings are in three different states for each step of the six commutation steps.

For example, upon detecting a first hall event where inputs 10 may be 010, controller 20 may connect or maintain a connection of a voltage $V_{dc}$ to Phase C by turning or keeping ON switch C+. Controller 20 may connect a ground to Phase A by turning ON switch A−. Controller 20 may also disconnect Phase B by turning OFF both switches B+ and B−.

Upon detecting a second hall event where inputs 10 may be 110, controller 20 may connect a voltage $V_{dc}$ to Phase B by turning ON switch B+. Controller 20 may maintain a ground connection at Phase A by keeping ON switch A−. Controller 20 may also disconnect Phase C by turning OFF both switches C+ and C−.

Upon detecting a third hall event where inputs 10 may be 100, controller 20 may maintain the voltage $V_{dc}$ to Phase B by keeping ON switch B+. Controller 20 may connect a ground connection at Phase C by turning ON switch C−. Controller 20 may also disconnect Phase A by turning OFF both switches A+ and A−.

Upon detecting a fourth hall event where inputs 10 may be 101, controller 20 may connect a voltage $V_{dc}$ to Phase A by turning ON switch A+. Controller 20 may maintain a ground connection at Phase C by keeping ON switch C−. Controller 20 may also disconnect Phase B by turning OFF both switches B+ and B−.

Upon detecting a fifth hall event where inputs 10 may be 001, controller 20 may maintain the voltage $V_{dc}$ at Phase A by keeping ON switch A+. Controller 20 may connect a ground connection at Phase B by turning ON switch B−. Controller 20 may also disconnect Phase C by turning OFF both switches C+ and C−.

Upon detecting a sixth hall event where inputs 10 may be 011, controller 20 may connect a voltage $V_{dc}$ to Phase C by turning ON switch C+. Controller 20 may maintain a ground connection at Phase B by keeping ON switch B−. Controller 20 may also disconnect Phase A by turning OFF both switches A+ and A−.

After detecting the sixth hall event, controller 20 may again detect the first hall event and perform the process (e.g., repeat the six commutation steps) as described above continuously until controller 20 receives either a POWER OFF signal or detects a hall sensor failure. It is understood that the switches from inverter 6 not mentioned above with respect to each hall event are assumed to be turned OFF by controller 20. An example commutation pattern and hall table for three hall sensors mode 200 is further described in FIG. 5 below.

Figure 4:
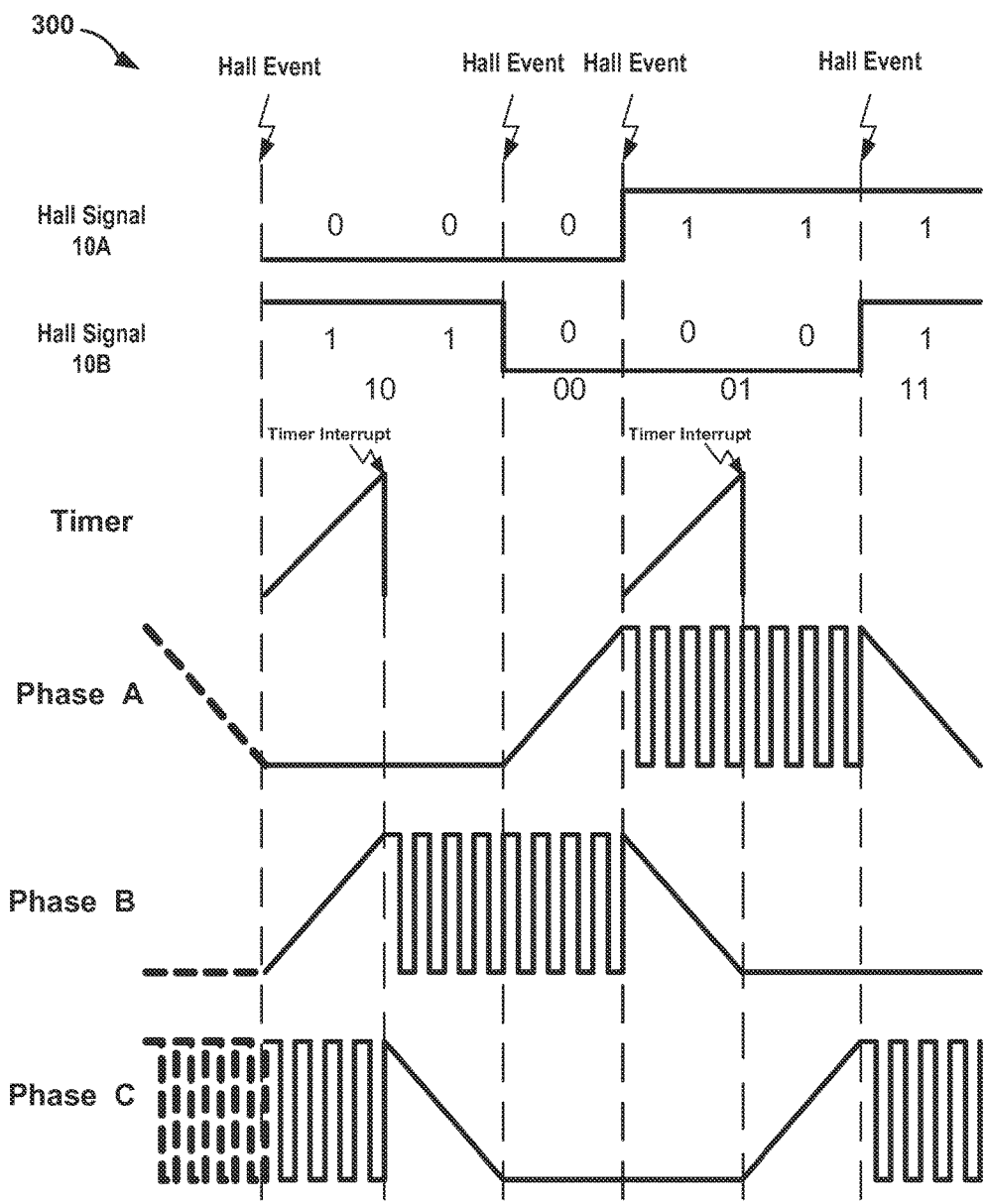
FIG. 4 is a timing diagram illustrating an example two hall sensors mode for one complete electrical revolution of a BLDC motor, in accordance with one or more aspects of this disclosure.

FIG. 4 is a timing diagram illustrating an example two hall sensors mode 300 for one complete electrical revolution of BLDC motor 8, in accordance with one or more aspects of this disclosure. FIG. 4 is described with respect to FIGS. 1 and 2. In the example of FIG. 4, two hall sensors mode 300 has four hall events because one hall sensor has failed, so each hall event is detected every sixty or one hundred and twenty degrees of electrical rotation of BLDC motor 8. Processor 23 may compare a sampled hall pattern (e.g., inputs 10 received by controller 20, which include hall events) to an expected hall pattern (e.g., a hall pattern stored in a look up table in memory 22). Processor 23 may also use the captured time between two correct hall events to apply commutation pattern in a period match interrupt service routine (ISR) to compensate for the missing hall event in addition to calculating the motor speed of BLDC motor 8. In other words, processor 23 may use the captured time between two correct hall events to determine a commutation time. Processor 23 may then use the determined commutation time to compensate for the missing hall event by replacing the missing hall event with a timer interrupt in a period match ISR.

In the example of FIG. 4, two hall sensors mode 300 has only four commutation steps of two hall sensors. For example, an initial hall event of two hall sensors, where a first hall sensor (Hall Signal 10A) is LOW and a second hall sensor (Hall Signal 10B) is HIGH. In this example, a second hall event of two hall sensors occurs after a first timer interrupt, where a first hall sensor (Hall Signal 10A) is LOW and a second hall sensor (Hall Signal 10B) is LOW. In this example, a third hall event of two hall sensors, where a first hall sensor (Hall Signal 10A) is HIGH and a second hall sensor (Hall Signal 10B) is LOW. In this example, a fourth hall event of two hall sensors occurs after a second timer interrupt, where a first hall sensor (Hall Signal 10A) is HIGH and a second hall sensor (Hall Signal 10B) is HIGH. As illustrated by FIG. 4, the missing hall events from the failed hall sensor are replaced by a first timer interrupt and a second timer interrupt.

As illustrated in FIG. 4, Hall signals 10A and 10B form part of inputs 10 received by controller 20, where Hall signals 10A and 10B are the signals from the two working hall sensors and may be HIGH and LOW signals similar to binary inputs. In this example, Hall Signal 10C may also form part of inputs 10, but Hall Signal 10C is either only a constant HIGH or LOW, and has been replaced by a timer interrupt provided by a timer or a timing module. Accordingly, input 10 at the first hall event is X10, at the second hall event is X00, at the third hall event is X01, and at the fourth hall event is X11, where X represents the either constant HIGH or LOW signal of Hall Signal 10C.

In two hall sensors mode 300, during each hall event and timer interrupt, controller 20 may turn ON and OFF switches (e.g., generate outputs 3 to turn ON and OFF switches A+ to C−) to either connect or maintain a connection of a particular motor phase winding (e.g., Phase A, Phase B, or Phase C) to a voltage $V_{dc}$ or a ground, or disconnect the particular motor phase winding from both the voltage $V_{dc}$ and the ground. As illustrated by FIG. 4, each of the motor phase windings are in three different states for each step of the six commutation steps.

For example, upon detecting a first hall event where inputs 10 may be X10, controller 20 may connect or maintain a connection of a voltage $V_{dc}$ to Phase C by turning or keeping ON switch C+. Controller 20 may connect a ground to Phase A by turning ON switch A−. Controller 20 may also disconnect Phase B by turning OFF both switches B+ and B−.

Upon determining or receiving a first timer interrupt, where inputs 10 may still be X10, controller 20 may connect a voltage $V_{dc}$ to Phase B by turning ON switch B+. Controller 20 may maintain a ground connection at Phase A by keeping ON switch A−. Controller 20 may also disconnect Phase C by turning OFF both switches C+ and C−.

Upon detecting a second hall event where inputs 10 may be X00, controller 20 may maintain the voltage $V_{dc}$ at Phase B by keeping ON switch B+. Controller 20 may connect a ground connection at Phase C by turning ON switch C−. Controller 20 may also disconnect Phase A by turning OFF both switches A+ and A−.

Upon detecting a third hall event where inputs 10 may be X01, controller 20 may connect a voltage $V_{dc}$ to Phase A by turning ON switch A+. Controller 20 may maintain a ground connection at Phase C by keeping ON switch C−. Controller 20 may also disconnect Phase B by turning OFF both switches B+ and B−.

Upon determining or receiving a second timer interrupt, where inputs 10 may still be X01, controller 20 may maintain the voltage $V_{dc}$ at Phase A by keeping ON switch A+. Controller 20 may connect a ground connection at Phase B by turning ON switch B−. Controller may also disconnect Phase C by turning OFF both switches C+ and C−.

Upon detecting a fourth hall event where inputs 10 may be X11, controller 20 may connect a voltage $V_{dc}$ to Phase C by turning ON switch C+. Controller 20 may maintain a ground connection at Phase B by keeping ON switch B−. Controller 20 may also disconnect Phase A by turning OFF both switches A+ and A−.

After detecting the fourth hall event, controller 20 may again detect the first hall event and perform the process (e.g., repeat the six commutation steps) as described above continuously until controller 20 receives a POWER OFF signal. It is understood that the switches from inverter 6 not mentioned above with respect to each hall event or timer interrupt are assumed to be turned OFF by controller 20. An example commutation pattern and hall table for two hall sensors mode 300 is further described in FIG. 6 below.

FIG. 5 is a table illustrating an example commutation pattern and hall table for three hall sensors mode 200 for one complete electrical revolution of BLDC motor 8, in accordance with one or more aspects of this disclosure. FIG. 5 is described with respect to FIGS. 1 and 3. In the example of FIG. 5, inputs 10 includes HIGH or LOW signals from three hall sensors (e.g., Hall Signal 10A, Hall Signal 10B, and Hall Signal 10C), and outputs 3 includes ON or OFF control signals for switches (e.g., switches A+-C−) in inverter 6. In some examples, outputs 3 may be a lookup table stored in memory of controller 20 (e.g., memory 22 as described in FIG. 2). Controller 20 as described below, associates a particular inputs 10 with a particular outputs 3, however, it should be understood that the description below is one example provided for ease of understanding of many examples.

As shown in the first row of entries in the table of FIG. 5, controller 20 may receive 010 as inputs 10 indicating an initial or first hall event, where Hall Signal 10C is LOW, Hall Signal 10B is HIGH, and Hall Signal 10A is LOW. Upon receiving 010 as inputs 10, controller 20 may generate outputs 3 to turn OFF switches B−, A+, B+, and C−, and turn ON switches A− and C+.

As shown in the second row of entries in the table of FIG. 5, controller 20 may receive 110 as inputs 10 indicating a second hall event, where Hall Signal 10C is HIGH, Hall Signal 10B is HIGH, and Hall Signal 10A is LOW. Upon receiving 110 as inputs 10, controller 20 may generate outputs 3 to turn OFF switches A+, B−, C−, and C+, and turn ON switches A− and B+.

As shown in the third row of entries in the table of FIG. 5, controller 20 may receive 100 as inputs 10 indicating a third hall event, where Hall Signal 10C is HIGH, Hall Signal 10B is LOW, and Hall Signal 10A is LOW Upon receiving 100 as inputs 10, controller 20 may generate outputs 3 to turn OFF switches A−, A+, B−, and C+, and turn ON switches B+ and C−.

As shown in the fourth row of entries in the table of FIG. 5, controller 20 may receive 101 as inputs 10 indicating a fourth hall event, where Hall Signal 10C is HIGH, Hall Signal 10B is LOW, and Hall Signal 10A is HIGH. Upon receiving 101 as inputs 10, controller 20 may generate outputs 3 to turn OFF switches A−, B−, and C+, and C+, turn ON switches A+ and C−.

As shown in the fifth row of entries in the table of FIG. 5, controller 20 may receive 001 as inputs 10 indicating a fifth hall event, where Hall Signal 10C is LOW, Hall Signal 10B is LOW, and Hall Signal 10A is HIGH. Upon receiving 001 as inputs 10, controller 20 may generate outputs 3 to turn OFF switches A−, B+, C− and C+, and turn ON switches A+ and B−.

As shown in the sixth row of entries in the table of FIG. 5, controller 20 may receive 011 as inputs 10 indicating a sixth hall event, where Hall Signal 10C is LOW, Hall Signal 10B is HIGH, and Hall Signal 10A is FIRM. Upon receiving Oil as inputs 10, controller 20 may generate outputs 3 to turn OFF switches A−, A+, B+, and C−, and turn ON switches B− and C+.

Controller 20 may then receive 010 as inputs 10 after receiving 011 as inputs 10 indicating an initial hall event and one complete electrical revolution of BLDC motor 8. Controller 20 may repeat the above described process until controller 20 receives a shutdown signal to turn OFF BLDC motor 8. In other words, there are six distinct input signals from three hall sensors (e.g., Hall Signal 10A, Hall Signal 10B, and Hall Signal 10C) associated with the six different commutation steps used to operate BLDC motor 8 until controller 20 receives a shutdown signal or one of the hall sensors fails.

FIG. 6 is a table illustrating an example commutation pattern and hall table for two hall sensors mode 300 for one complete electrical revolution of BLDC motor 8, in accordance with one or more aspects of this disclosure. FIG. 6 is described with respect to FIGS. 1 and 4. In the example of FIG. 6, inputs 10 includes HIGH or LOW signals from Hall signals 10A and 10B, and only a LOW signal from Hall Signal 10C because the hall sensor providing the output of Hall Signal 10C has failed, and outputs 3 includes ON or OFF control signals for switches (e.g., switches A+-C−) in inverter 6. In some examples, outputs 3 may be a lookup table stored in memory of controller 20 (e.g., memory 22 as described in FIG. 2). Controller 20 as described below, associates a particular inputs 10 with a particular outputs 3, however, it should be understood that the description below is one example of many examples provided for ease of understanding.

As shown in the first row of entries in the table of FIG. 6, controller 20 may receive 010 as inputs 10 indicating an initial hall event, where Hall Signal 10C is LOW, Hall Signal 10B is HIGH, and Hall Signal 10A is LOW. Upon receiving 010 as inputs 10, controller 20 may generate outputs 3 to turn OFF switches A+, B−, B+, and C−, and turn ON switches A− and C+.

As shown in the second row of entries in the table of FIG. 6, controller 20 may receive 010 as inputs 10 indicating the initial hall event, where Hall Signal 10C is LOW, Hall Signal 10B is HIGH, and Hall Signal 10A is LOW. However, due to the failure of Hall Signal 10C, this may be the second hall event and not the initial hall event. Thus, upon receiving 010 as inputs 10 and a timer interrupt from an external timer or a timing module, controller 20 may determine this to be the second hall event and generate outputs 3 to turn OFF switches A+, B−, C−, and C+, and turn ON switches A− and B+.

As shown in the third row of entries in the table of FIG. 6, controller 20 may receive 000 as inputs 10 indicating a third hall event, where Hall Signal 10C is LOW, Hall Signal 10B is LOW, and Hall Signal 10A is LOW. Upon receiving 000 as inputs 10, controller 20 may generate outputs 3 to turn OFF switches A−, A+, B−, and C+, and turn ON switches B+ and C−.

As shown in the fourth row of entries in the table of FIG. 6, controller 20 may receive 001 as inputs 10 indicating a fourth hall event, where Hall Signal 10C is LOW, Hall Signal 10B is LOW, and Hall Signal 10A is HIGH. Upon receiving 001 as inputs 10, controller 20 may generate outputs 3 to turn OFF switches A−, B−, B+, and C+, and turn ON switches A+ and C−.

As shown in the fifth row of entries in the table of FIG. 6, controller 20 may receive 001 as inputs 10 indicating the fourth hall event, where Hall Signal 10C is LOW, Hall Signal 10B is LOW, and Hall Signal 10A is HIGH. However, due to the failure of Hall Signal 10C, this may be the fifth hall event and not the fourth hall event. Thus, upon receiving 001 as inputs 10 and a timer interrupt from an external timer or a timing module, controller 20 may generate outputs 3 to turn OFF switches A−, B+, C−, and C+, and turn ON switches A+ and B−.

As shown in the sixth row of entries in the table of FIG. 6, controller 20 may receive 011 as inputs 10 indicating a sixth hall event, where Hall Signal 10C is LOW, Hall Signal 10B is HIGH, and Hall Signal 10A is HIGH. Upon receiving 011 as inputs 10, controller 20 may generate outputs 3 to turn OFF switches A−, A+, B+, and C−, and turn ON switches B− and C+.

Controller 20 may then receive 010 as inputs 10, where Hall Signal 10C is LOW, Hall Signal 10B is HIGH, and Hall Signal 10A is LOW. Controller 20 may repeat the above described process until controller 20 receives a shutdown signal to turn OFF BLDC motor 8.

In other words, due to the failure of a hall sensor, there are only four distinct input signals from the two hall sensors associated with the six commutation steps used to operate BLDC motor 8. To compensate for the failure of a hall sensor, in some examples, controller 20 may use a timer interrupt to differentiate between similar signals of the four distinct input signals, effectively achieving six distinct input signals from four distinct input signals. In some examples, the timer interrupt may be provided by a timing module of controller 20. In other examples, the diner interrupt may be provided by a diner external to controller 20. Although, the failure of a hall sensor has been illustrated as a constant LOW signal, it should be understood that the failure of a hall sensor could also be a constant HIGH signal.

Figure 7:
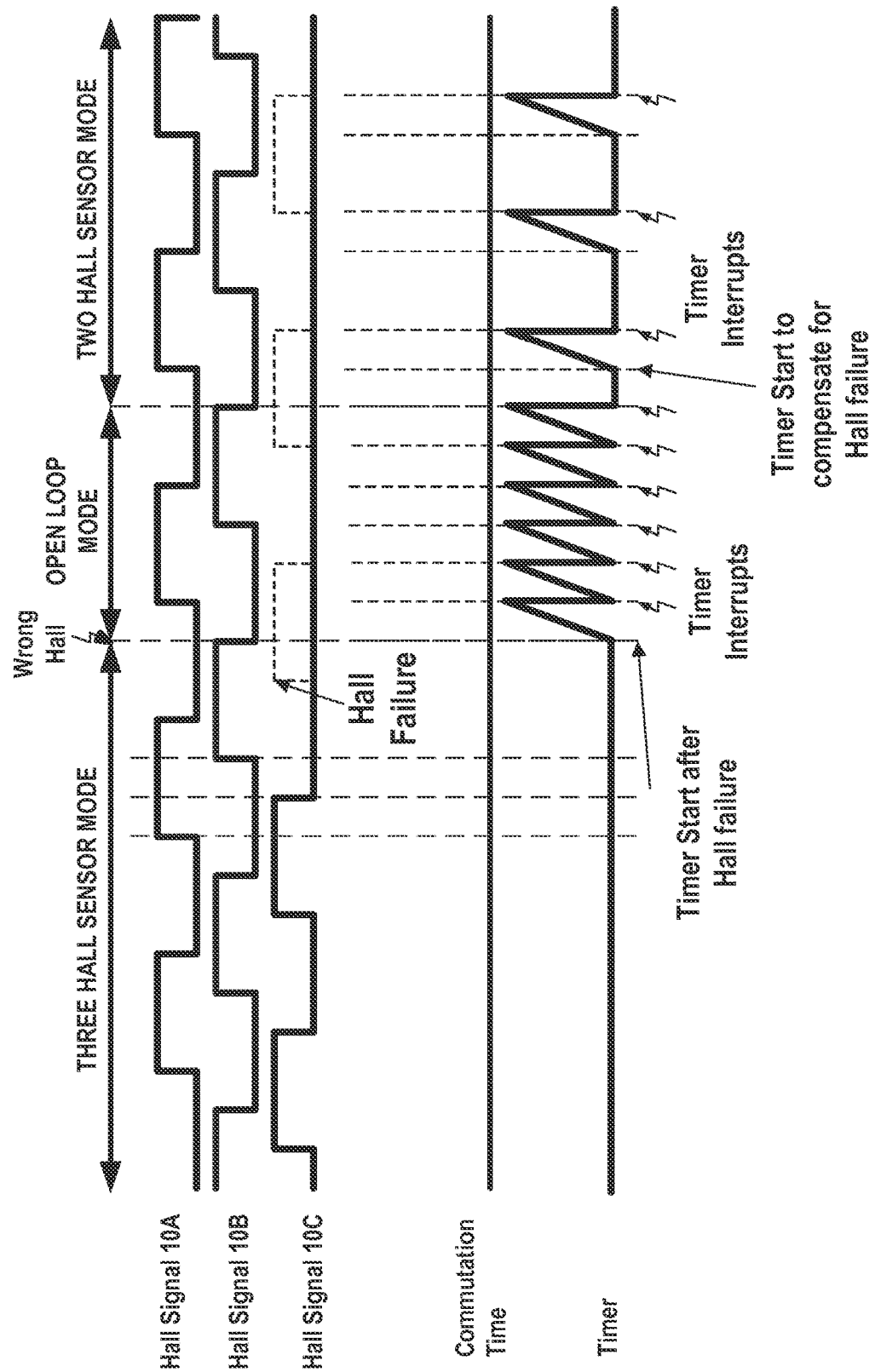
FIG. 7 is a timing diagram illustrating example modes of a controller, in accordance with one or more aspects of this disclosure.

FIG. 7 is a timing diagram illustrating example modes of controller 20, in accordance with one or more aspects of this disclosure. FIG. 7 is described with respect to FIGS. 1 and 2. In the example of FIG. 7, during the three hall sensor mode of controller 20 (e.g., three hall sensors mode 200 as described in FIGS. 3 and 5), inputs 10 includes input signals from three hall sensors and are used to generate outputs 3 to operate BLDC motor 8. For example, during the three hall sensor mode of controller 20, inputs 10 may be sufficient to detect the rotor position of BLDC motor 8 and apply the appropriate commutation pattern. However, upon the failure of one of the three hall sensors and during the three hall sensor mode of controller 20, inputs 10 may no longer sufficient to detect the rotor position of BLDC motor 8 and apply the appropriate commutation pattern.

When any one of the three hall sensors fails during the three hall sensors mode of controller 20, controller 20 may operate in an open loop mode by running the motor at the same speed in order to detect the failed hall sensor and switch the control scheme of controller 20 to two hall sensor mode (e.g., two hall sensors mode 300 as described in FIGS. 4 and 6).

As illustrated in FIG. 7, a hall sensor failure triggers a wrong hall event due to a difference between a sampled hall pattern and an expected hall pattern. When controller 20 detects a wrong hall event, controller 20 may disable three hall sensors mode and instead controller 20 may operate for one electrical revolution in an open loop mode. In these examples, controller 20 may identify the failed hall sensor in at least four commutation steps of the open loop mode. At the start of the open loop mode, controller 20 may use a timing module or an external timer to start detecting a commutation time between two correct hall events (e.g., the time between the wrong hall event and the next correct hall event) and apply commutation patterns based on the detected commutation time and with the same duty cycle to maintain the same motor speed of BLDC motor 8. In other words, during open loop mode, controller 20 may not apply commutation patterns based on inputs 10. Instead, controller 20 may apply commutation patterns based on an expected commutation pattern and a detected commutation time and with the same duty cycle to maintain the same motor speed of BLDC motor 8 for one electrical revolution. In this manner, controller 20 may be able to prevent or substantially reduce any change to the operation of BLDC motor 8 when controller 20 switches from operating in three hall sensors mode to operating in open loop mode while identifying the failed hall sensor.

In other words, controller 20 may operate in open loop mode for one electrical revolution of BLDC motor 8 (e.g., apply 6 commutation patterns), during this period controller 20 may read all the three hall sensor input values from inputs 10 whenever a commutation pattern is applied by controller 20. Controller 20 may identify a failed hall sensor by capturing hall values from inputs 10 during the entire open loop mode, and any one hall sensor that does not change its value (i.e., any Hall Signal 10A, 10B, or 10C that does not change) during the entire open loop mode has failed. A failed hall sensor may be defined as maintaining either a HIGH or LOW signal during one complete electrical revolution of BLDC motor 8. For example, if the hall sensor providing Hall Signal 10C fails then the value of Hall Signal 10C will be either HIGH or LOW (e.g., 0 or 1) for one complete electrical revolution as illustrated in FIG. 8.

After identification of faulty hall sensor, controller 20 may update the commutation pattern and hall table for two hall sensor based control scheme. In other words, controller 20 may adapt to the faulty hall sensor by updating the commutation pattern and hall table for two hall sensors mode based on the detected values of the hall sensors during the open loop mode of controller 20. For example, controller 20 may update commutation and hall tables by using adaptive hall pattern detection or by rearranging the table that is used for three hall sensors mode. After operating in open loop mode, controller 20 may switch the control scheme of controller 20 to two hall sensors mode after updating the commutation and hall table associated with the two hall sensors mode. In this manner, controller 20 may be able to prevent or substantially reduce any change to the operation of BLDC motor 8 when controller 20 is operating in three hall sensors mode, open loop mode, and two hall sensors mode, allowing controller 20 to operate BLDC motor 8 continuously.

Controller 20 as described above detects a failed hall sensor and switches to a two hall sensors mode from a three hall sensors mode. However, it is appreciated that controller using the similar techniques may also detect a fixed hall sensor and switches back to a three hall sensors mode from a two hall sensors mode. In other words, if a failed hall sensor is replaced by a functioning hall sensor, controller 20 may operate in open loop mode and switch to the three hall sensors mode.

FIG. 8 is a table illustrating example hall tables for the example modes of controller 20, in accordance with one or more aspects of this disclosure. FIG. 8 is described with respect to FIGS. 1 and 7.

In the example of FIG. 8, controller 20 operates in a three hall sensors mode receiving inputs 10, and inputs 10 includes six distinct input signals (e.g. a hall event). For example, controller 20 receives 001, 011, 010, 110, 100, or 101 as inputs 10 from three hall sensors, and compares inputs 10 to an expected hall pattern of the three hall sensors. Controller 20 generates outputs 3 according to inputs 10 and provides generated outputs 3 to driver 4. Driver 4 receives generated outputs 3 and generates driver output 5 based on generated outputs 3 to inverter 6. Inverter 6 provides energy to the appropriate phase windings of BLDC motor 8 based on generated driver output 5, causing the rotor of BLDC motor 8 to rotate.

Controller 20 may detect a wrong hall event when comparing inputs 10 to the expected hall pattern of the three hall sensors. Upon detecting a wrong hall event, controller 20 may operate in an open loop mode for one electrical revolution of BLDC motor 8 (e.g., six commutation steps) to identify the failed hall sensor. In parallel, controller 20 may also use a timing module or an external timer to determine a commutation time and continue to apply commutations patterns to BLDC motor 8 based on the expected hall pattern and the determined commutation time. As illustrated in FIG. 8, in some examples, controller 20 may detect that Hall Signal 10C may have an "X" through all six commutation steps, where X represents either a constant LOW or HIGH signal and that the hall sensor outputting Hall Signal 10C has failed.

When controller 20 has identified the failed hall sensor (e.g., the hall sensor outputting Hall Signal 10C), controller 20 may update the commutation pattern and hall table for two hall sensors mode accordingly. As illustrated in the FIG. 8, in some examples, controller 20 may update the commutation pattern and hall table to include timer interrupts from a timer. Controller 20 may use the included timer interrupts to differentiate between the four distinct input signals of inputs 10 from the three hall sensors. In some examples, the timer interrupts are based on a commutation time between two previous correct hall events. In these examples, the timer interrupts are dependent on the correct hall events which provide the correct indication of the rotor position and motor speed of BLDC motor 8.

In other words, after operating in open loop mode, controller 20 will identify the failed sensor (e.g., the hall sensor outputting Hall Signal 10C), and include timer interrupts from a timer where inputs 10 does not change between hall events. For example, as illustrated in FIG. 8, the last inputs 10 of open loop mode received by controller 20 may be represented as X01, and the first inputs 10 of two hall sensors mode without timer interrupts may also be represented as X01. By including timer interrupts from a timer, controller 20 may compensate for the failed hall sensor by differentiating between the signals of inputs 10.

Figure 9:
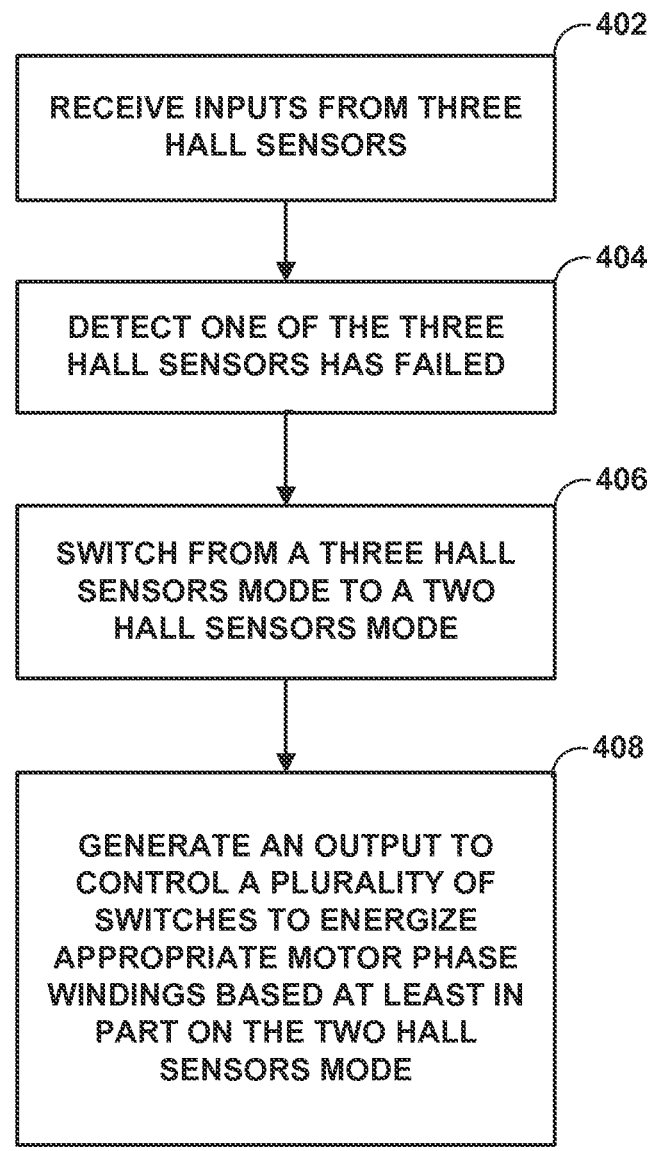
FIG. 9 is a flowchart illustrating an example method for operations of an example controller to control the operation of a BLDC motor, in accordance with one or more aspects of this disclosure.

FIG. 9 is a flowchart illustrating an example method for operations of example controller 20 to control the operation of BLDC motor 8, in accordance with one or more aspects of this disclosure. FIG. 9 is described with respect to FIG. 1. Controller 20 may be configured to receive inputs 10 from three hall sensors (402).

Controller 20 may be configured to detect that one of the three hall sensors has failed based on the received inputs (404). In some examples, controller 20 may be configured to detect that the one of the three hall sensors has failed based on the received inputs by sampling a hall pattern of the received inputs from the three hall sensors, comparing the sampled hall pattern to an expected hall pattern, and determining whether a comparison between the sampled hall pattern and the expected hall pattern indicates a failure of the one of the three hall sensors. In some examples, controller 20 may be configured to sample the hall pattern every sixty degrees out of three hundred and sixty degrees of an electrical rotation. In some examples, controller 20 may be configured to determine whether the comparison between the sampled hall pattern and the expected hall pattern indicates the failure of the one of the three hall sensors by detecting that the input from the one of the three hall sensors in the sampled hall pattern should be HIGH and not LOW, or detecting that the input from the one of the three hall sensors in the sampled hall pattern should be LOW and not HIGH.

Controller 20 may be configured to switch from a three hall sensors mode to a two hall sensors mode in response to detecting that the one of the three hall sensors has failed (406). In some examples, controller 20 may be configured to switch from the three hall sensors mode to the two hall sensors mode by disabling the three hall sensor mode, operating in an open loop mode for at least one electrical revolution of the BLDC motor, and operating in the two hall sensors mode after operating in the open loop mode, wherein the two hall sensors mode is based on a commutation and hall table for a two hall sensor control scheme. In some examples, controller 20 may be configured to switch from the three hall sensors mode to the two hall sensors mode may further include identifying a failed hall sensor of the three hall sensors during the open loop mode, and updating the commutation and hall table for the two hall sensor control scheme based on the identified failed hall sensor. In these examples, controller 20 may identify the failed hall sensor of the three hall sensors during the open loop mode by determining whether the received inputs from each of the three hall sensors remains unchanged during the at least one electrical revolution of the open loop mode. In some examples, controller 20 may operate in the two hall sensors mode by timing a period value equal to time captured between two received inputs of the working two hall sensors, and applying a commutation pattern in a period match interrupt service routine to compensate for the failed hall sensor. The two received inputs may each comprise the sampled hall pattern that matches the expected hall pattern. In some examples, controller 20 may operate in the open loop mode by detecting a commutation time from the received inputs, and applying commutation patterns based on the detected commutation time with a substantially similar duty cycle to maintain a current motor speed of the BLDC motor.

Controller 20 may be configured to generate an output to control a plurality of switches to energize appropriate motor phase windings in the BLDC motor based at least in part on the two hall sensors mode (408). In some examples, controller 20 may generate the output to control the plurality of switches to energize appropriate motor phase windings in the BLDC motor based at least in part on the two hall sensors mode by generating a driver output to control a driver that operates the plurality of switches to energize the appropriate motor phase windings in the BLDC motor based at least in part on the two hall sensors mode.

The following examples illustrate methods, devices, and systems described herein.

Example 1

A method for controlling a brushless DC (BLDC) motor, the method comprising receiving inputs from three hall sensors, detecting one of the three hall sensors has failed based on the received inputs, responsive to detecting that the one of the three hall sensors has failed, switching from a three hall sensors mode to a two hall sensors mode, and generating an output to control a plurality of switches to energize appropriate motor phase windings in the BLDC motor based at least in part on the two hall sensors mode.

Example 2

The method of example 1, wherein detecting the one of the three hall sensors has failed based on the received inputs comprises sampling a hall pattern of the received inputs from the three hall sensors, comparing the sampled hall pattern to an expected hall pattern, and determining whether a comparison between the sampled hall pattern and the expected hall pattern indicates a failure of the one of the three hall sensors.

Example 3

The method of example 2, wherein the sampling occurs every sixty degrees out of three hundred and sixty degrees of an electrical rotation.

Example 4

The method of example 2 or 3, wherein determining whether the comparison between the sampled hall pattern and the expected hall pattern indicates the failure of the one of the three hall sensors comprises one of detecting that the input from the one of the three hall sensors in the sampled hall pattern should be HIGH and not LOW, or detecting that the input from the one of the three hall sensors in the sampled hall pattern should be LOW and not HIGH.

Example 5

The method of any of examples 1 to 4, wherein responsive to detecting that the one of the three hall sensors has failed, switching from the three hall sensors mode to the two hall sensors mode comprises disabling the three hall sensor mode, operating in an open loop mode for at least one electrical revolution of the BLDC motor, and operating in the two hall sensors mode after operating in the open loop mode, wherein the two hall sensors mode is based on a commutation and hall table for a two hall sensor control scheme.

Example 6

The method of example 5, wherein responsive to detecting that the one of the three hall sensors has failed, switching from the three hall sensors mode to the two hall sensors mode further comprises identifying a failed hall sensor of the three hall sensors during the open loop mode, and updating the commutation and hall table for the two hall sensor control scheme based on the identified failed hall sensor.

Example 7

The method of example 6, wherein identifying the failed hall sensor of the three hall sensors during the open loop mode comprises determining whether the received inputs from each of the three hall sensors remains unchanged during the at least one electrical revolution of the open loop mode.

Example 8

The method of examples 6 or 7, wherein operating in the two hall sensors mode comprises timing a period value equal to time captured between two received inputs of the working two hall sensors of the three hall sensors, wherein the two received inputs each comprise the sampled hall pattern that matches the expected hall pattern, and applying a commutation pattern in a period match interrupt service routine to compensate for the failed hall sensor.

Example 9

The method of any of examples 5 to 8, wherein operating in the open loop mode comprises detecting a commutation time from the received inputs, and applying commutation patterns based on the detected commutation time with a substantially similar duty cycle to maintain a current motor speed of the BLDC motor.

Example 10

The method of any of examples 1 to 9, wherein generating the output to control the plurality of switches to energize appropriate motor phase windings in the BLDC motor based at least in part on the two hall sensors mode comprises generating a driver output to control a driver that operates the plurality of switches to energize the appropriate motor phase windings in the BLDC motor based at least in part on the two hall sensors mode.

Example 11

A controller for controlling a brushless DC (BLDC) motor, the controller comprising a hall control module configured to receive inputs from three hall sensors, detect one of the three hall sensors has failed based on the received inputs, responsive to detecting that the one of the three hall sensors has failed, switch from a three hall sensors mode to a two hall sensors mode, and generate an output to control a plurality of switches to energize appropriate motor phase windings in the BLDC motor based at least in part on the two hall sensors mode.

Example 12

The controller of example 11, wherein the hall control module is configured to detect the one of the three hall sensors has failed based on the received inputs comprises the hall control module configured to sample a hall pattern of the received inputs from the three hall sensors, compare the sampled hall pattern to an expected hall pattern, and determine whether a comparison between the sampled hall pattern and the expected hall pattern indicates a failure of the one of the three hall sensors.

Example 13

The controller of example 11 or 12, wherein responsive to detecting that the one of the three hall sensors has failed, the hall control module is configured to switch from the three hall sensors mode to the two hall sensors mode comprises the hall control module configured to disable the three hall sensor mode, operate in an open loop mode for at least one electrical revolution of the BLDC motor, and operate in the two hall sensors mode after operating in the open loop mode, wherein the two hall sensors mode is based on a commutation and hall table for a two hall sensor control scheme.

Example 14

The controller of example 13, wherein responsive to detecting that the one of the three hall sensors has failed, the hall control module is configured to switch from the three hall sensors mode to the two hall sensors mode comprises the hall control module further configured to identify a failed hall sensor of the three hall sensors during the open loop mode, and update the commutation and hall table for the two hall sensor control scheme based on the identified failed hall sensor.

Example 15

The controller of example 14, wherein the hall control module is configured to identify the failed hall sensor of the three hall sensors during the open loop mode comprises the hall control module configured to determine whether the received inputs from each of the three hall sensors remain unchanged during the at least one electrical revolution of the open loop mode.

Example 16

The controller of example 14 or 15, wherein the controller further comprises a timer, wherein the timer is configured to time a period value equal to time captured between two received inputs of the working two hall sensors of the three hall sensors, wherein the two received inputs each comprise the sampled hall pattern that matches the expected hall pattern, and wherein the hall control module is configured to operate in the two hall sensors mode comprises the hall control module configured to apply a commutation pattern in a period match interrupt service routine to compensate for the failed hall sensor.

Example 17

The controller of any of examples 13 to 16, wherein the controller further comprises a timing module configured to detect a commutation time from the received inputs, and wherein the hall control module is configured to operate in the open loop mode comprises the hall control module configured to apply commutation patterns based on the detected commutation time with a substantially similar duty cycle to maintain a current motor speed of the BLDC motor.

Example 18

The controller of any of examples 11 to 17, further comprising a pulse modulator, wherein the hall control module is configured to generate the output to control the plurality of switches to energize appropriate motor phase windings in the BLDC motor based at least in part on the two hall sensors mode comprises providing the output to the pulse modulator, and wherein the pulse modulator is configured to generate a driver output to control a driver that operates the plurality of switches to energize the appropriate motor phase windings in the BLDC motor based at least in part on the two hall sensors mode.

Example 19

A system comprising three hall sensors, a brushless DC (BLDC) motor, and a controller for controlling the BLDC motor, wherein the controller includes a hall control module configured to receive inputs from the three hall sensors, detect one of the three hall sensors has failed based on the received inputs, responsive to detecting that the one of the three hall sensors has failed, switch from a three hall sensors mode to a two hall sensors mode, and generate an output to control a plurality of switches to energize appropriate motor phase windings in the BLDC motor based at least in part on the two hall sensors mode.

Example 20

The system of example 19, wherein responsive to detecting that the one of the three hall sensors has failed, the hall control module is configured to switch from the three hall sensors mode to the two hall sensors mode comprises the hall control module configured to disable the three hall sensor mode, operate in an open loop mode for at least one electrical revolution of the BLDC motor, and operate in the two hall sensors mode after operating in the open loop mode, wherein the two hall sensors mode is based on a commutation and hall table for a two hall sensor control scheme.

The aforementioned examples are used to show examples or applications that are applicable to the techniques and circuits described herein. In one or more examples, the functions described may be implemented in hardware, software, firmware, or any combination thereof. For example, one or more of the controllers described herein implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for controlling a brushless DC (BLDC) motor, the method comprising:
   receiving, by a control module of a controller, inputs from three hall sensors;
   detecting, by the control module and based on the received inputs, one of the three hall sensors has failed;
   responsive to detecting that the one of the three hall sensors has failed, switching, by the control module, from a three hall sensors mode to a two hall sensors mode by at least:
      disabling, by the control module, the three hall sensors mode;
      responsive to disabling the three hall mode, operating, by the control module, in an open loop mode for at least one electrical revolution of the BLDC motor, wherein operating in the open loop mode comprises:
         determining, by the control module, a commutation time from the received inputs;
         applying a commutation pattern, by the control module, based on an expected commutation pattern rather than the inputs from the three hall sensors, and based on the determined commutation time, with a same duty cycle, to maintain a current motor speed of the BLDC motor; and
      after operating in the open loop mode for at least one electrical revolution of the BLDC motor, operating, by the control module, in the two hall sensors mode, wherein the two hall sensors mode is based on a lookup table for a two hall sensor control scheme, wherein the lookup table defines a relationship between a set of input signals associated with the three Hall sensors and a set of control signals for a plurality of switches; and
   generating, by the control module, an output to control the plurality of switches to energize appropriate motor phase windings in the BLDC motor based at least in part on the two hall sensors mode.

2. The method of claim 1, wherein detecting the one of the three hall sensors has failed comprises:
   sampling, by the control module, a hall pattern of the received inputs from the three hall sensors;
   comparing, by the control module, the sampled hall pattern to an expected hall pattern; and
   determining, by the control module, whether a comparison between the sampled hall pattern and the expected hall pattern indicates a failure of the one of the three hall sensors.

3. The method of claim 1, wherein switching from the three hall sensors mode to the two hall sensors mode further comprises:
   identifying, by the control module, a failed hall sensor of the three hall sensors during the open loop mode; and
   updating, by the control module, the commutation and hall table for the two hall sensor control scheme based on the identified failed hall sensor.

4. The method of claim 1, further comprising:
   receiving, by a pulse modulator of the control, the output generated by the control module; and
   generating, by the pulse modulator, a driver output to control a driver that operates the plurality of switches to energize the appropriate motor phase windings in the BLDC motor based at least in part on the two hall sensors mode.

5. The method of claim 1, further comprising:
   detecting, by the control module, the hall sensor which previously failed is no longer in a failed state; and
   responsive to detecting the hall sensor is no longer in a failed state, switching, by the control module, from the two hall sensors mode back to the three hall sensors mode.

6. The method of claim 1, wherein applying the commutation pattern while operating in the open loop mode further comprises providing, by the control module, a timer interrupt for each commutation of the expected commutation pattern.

7. The method of claim 2, wherein the control module samples the hall pattern every sixty degrees out of three hundred and sixty degrees of an electrical rotation.

8. The method of claim 2, wherein determining whether the comparison between the sampled hall pattern and the expected hall pattern indicates the failure of the one of the three hall sensors comprises one of:
   determining, by the control module, that the input from the one of the three hall sensors in the sampled hall pattern should be HIGH and not LOW; or
   determining, by the control module, that the input from the one of the three hall sensors in the sampled hall pattern should be LOW and not HIGH.

9. The method of claim 3, wherein identifying the failed hall sensor of the three hall sensors during the open loop mode comprises:
   determining, by the control module, whether the received inputs from each of the three hall sensors remains unchanged during the at least one electrical revolution of the open loop mode.

10. The method of claim 3, wherein operating in the two hall sensors mode comprises:
    timing, by the control module, a period value equal to time captured between two received inputs of the working two hall sensors of the three hall sensors, wherein the two received inputs each comprise the sampled hall pattern that matches the expected hall pattern; and
    applying, by the control module, a commutation pattern in a period match interrupt service routine to compensate for the failed hall sensor.

11. A controller for controlling a brushless DC (BLDC) motor, the controller comprising a control module configured to:
    receive inputs from three hall sensors;

detect one of the three hall sensors has failed based on the received inputs;
responsive to detecting that the one of the three hall sensors has failed, switch from a three hall sensors mode to a two hall sensors mode by at least being configured to:
disable the three hall sensors mode;
responsive to disabling the three hall mode, operate in an open loop mode for at least one electrical revolution of the BLDC motor, wherein operating in the open loop mode comprises:
determining a commutation time from the received inputs;
applying a commutation pattern, based on an expected commutation pattern rather than the inputs from the three hall sensors, and based on the determined commutation time, with a same duty cycle, to maintain a current motor speed of the BLDC motor; and
after operating in the open loop mode for at least one electrical revolution of the BLDC motor, operate in the two hall sensors mode, wherein the two hall sensors mode is based on a lookup table for a two hall sensor control scheme, wherein the lookup table defines a relationship between a set of input signals associated with the three Hall sensors and a set of control signals for a plurality of switches; and
generate an output to control the plurality of switches to energize appropriate motor phase windings in the BLDC motor based at least in part on the two hall sensors mode.

12. The controller of claim 11, wherein the control module is configured to detect the one of the three hall sensors has failed by at least being configured to:
sample a hall pattern of the received inputs from the three hall sensors;
compare the sampled hall pattern to an expected hall pattern; and
determine whether a comparison between the sampled hall pattern and the expected hall pattern indicates a failure of the one of the three hall sensors.

13. The controller of claim 11, wherein the control module is configured to switch from the three hall sensors mode to the two hall sensors mode by at least being configured to:
identify a failed hall sensor of the three hall sensors during the open loop mode; and
update the commutation and hall table for the two hall sensor control scheme based on the identified failed hall sensor.

14. The controller of claim 11, further comprising a pulse modulator,
wherein the control module is configured to provide the output to control the plurality of switches to the pulse modulator, and
wherein the pulse modulator is configured to generate a driver output to control a driver that operates the plurality of switches to energize the appropriate motor phase windings in the BLDC motor based at least in part on the two hall sensors mode.

15. The controller of claim 11, wherein the control module is configured to apply the commutation pattern while operating in the open loop mode by at least providing a timer interrupt for each commutation of the expected commutation pattern.

16. The controller of claim 13, wherein the control module is configured to identify the failed hall sensor of the three hall sensors during the open loop mode by at least being configured to:
determine whether the received inputs from each of the three hall sensors remain unchanged during the at least one electrical revolution of the open loop mode.

17. The controller of claim 13, further comprising:
a timer configured to time a period value equal to time captured between two received inputs of the working two hall sensors of the three hall sensors,
wherein the two received inputs each comprise the sampled hall pattern that matches the expected hall pattern, and
wherein the control module is configured to operate in the two hall sensors mode by at least being configured to apply a commutation pattern in a period match interrupt service routine to compensate for the failed hall sensor.

18. A system comprising:
three hall sensors;
a brushless DC (BLDC) motor; and
a controller for controlling the BLDC motor, wherein a control module of the controller is configured to at least:
receive inputs from the three hall sensors;
detect one of the three hall sensors has failed based on the received inputs;
responsive to detecting that the one of the three hall sensors has failed, switch from a three hall sensors mode to a two hall sensors mode by at least being configured to:
disable the three hall sensor mode;
responsive to disabling the three hall mode, operate in an open loop mode for at least one electrical revolution of the BLDC motor, wherein operating in the open loop mode comprises:
determining a commutation time from the received inputs;
applying a commutation pattern, based on an expected commutation pattern rather than the inputs from the three hall sensors, based on the determined commutation time, with a same duty cycle, to maintain a current motor speed of the BLDC motor; and
after operating in the open loop mode for at least one electrical revolution of the BLDC motor, operate in the two hall sensors mode, wherein the two hall sensors mode is based on a lookup table for a two hall sensor control scheme, wherein the lookup table defines a relationship between a set of input signals associated with the three Hall sensors and a set of control signals for a plurality of switches; and
generate an output to control the plurality of switches to energize appropriate motor phase windings in the BLDC motor based at least in part on the two hall sensors mode.

19. The system of claim 18, wherein the control module is configured to apply the commutation pattern while operating in the open loop mode by at least providing a timer interrupt for each commutation of the expected commutation pattern.

20. The system of claim 18, further comprising:
a timer configured to time a period value equal to time captured between two received inputs of the working two hall sensors of the three hall sensors, wherein the two received inputs each comprise the sampled hall pattern that matches the expected hall pattern, and wherein the control module is configured to operate in the two hall sensors mode by at least being configured to apply a commutation pattern in a period match interrupt service routine to compensate for the failed hall sensor.

\* \* \* \* \*